(12) United States Patent
Endo et al.

(10) Patent No.: US 12,738,870 B2
(45) Date of Patent: Sep. 15, 2026

(54) MOTOR CONTROL DEVICE AND MOTOR

(71) Applicant: NIDEC CORPORATION, Kyoto (JP)

(72) Inventors: Shuji Endo, Kyoto (JP); Takashi Hattori, Kyoto (JP); Yoshiaki Yamashita, Kyoto (JP); Sohei Miyake, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 251 days.

(21) Appl. No.: 18/762,122

(22) Filed: Jul. 2, 2024

(65) Prior Publication Data

US 2025/0015739 A1 Jan. 9, 2025

Related U.S. Application Data

(60) Provisional application No. 63/525,168, filed on Jul. 6, 2023.

(30) Foreign Application Priority Data

Jan. 31, 2024 (JP) ................................ 2024-013570

(51) Int. Cl.

| | |
|---|---|
| ***H02P 21/22*** | (2016.01) |
| ***H02K 9/22*** | (2006.01) |
| ***H02K 11/01*** | (2016.01) |
| ***H02K 11/215*** | (2016.01) |
| ***H02K 11/30*** | (2016.01) |
| ***H02P 21/00*** | (2016.01) |
| ***H02P 21/06*** | (2016.01) |
| ***H02P 21/14*** | (2016.01) |

(52) U.S. Cl.

CPC ......... *H02P 21/0017* (2013.01); *H02K 9/227* (2021.01); *H02K 11/01* (2016.01); *H02K 11/215* (2016.01); *H02K 11/30* (2016.01); *H02P 21/06* (2013.01); *H02P 21/14* (2013.01); *H02P 21/22* (2016.02)

(58) Field of Classification Search

CPC ...... H02K 29/08; H02K 11/30; H02K 11/215; H02K 11/01; H02K 9/227; H02P 21/0017; H02P 21/22; H02P 21/14; H02P 21/06

USPC ..................................................... 318/400.02

See application file for complete search history.

(56) References Cited

U.S. PATENT DOCUMENTS 11,251,727 B2 * 2/2022 Iezawa ...................... H02P 6/08
11,594,992 B2 * 2/2023 Iwai .......................... H02P 6/10
(Continued)

FOREIGN PATENT DOCUMENTS

JP 2006-158059 A 6/2006

*Primary Examiner* — Gabriel Agared
(74) *Attorney, Agent, or Firm* — Keating & Bennett, LLP

(57) ABSTRACT

A motor control device that controls a motor includes a calculator to calculate angle information related to a rotation angle of a rotor of the motor based on an output from a magnetic sensor, and a corrector to correct the angle information calculated by the calculator. The magnetic sensor is a sensor that includes a magnetoresistance effect element and outputs signals of two systems out of phase with each other by 180°. The corrector corrects the angle information using a correction amount expressed by a function including a current value of a motor current supplied to a stator of the motor and a phase angle of the motor current, a current value of a power source current supplied to the motor control device, and a mechanical angle of the rotor calculated based on an output from the magnetic sensor.

7 Claims, 3 Drawing Sheets

(56) References Cited

U.S. PATENT DOCUMENTS

| | | | | |
|---|---|---|---|---|
| 2007/0046249 | A1* | 3/2007 | Tomigashi | H02P 21/18 318/807 |
| 2007/0132423 | A1* | 6/2007 | Ajima | H02P 6/10 318/719 |
| 2010/0225307 | A1* | 9/2010 | Takahashi | G01P 3/488 324/207.25 |
| 2016/0202087 | A1* | 7/2016 | Kadoike | G01B 7/30 324/207.12 |
| 2017/0366126 | A1* | 12/2017 | Sinner | H02P 6/185 |
| 2019/0367093 | A1* | 12/2019 | Suzuki | G01D 5/145 |
| 2019/0368894 | A1* | 12/2019 | Suzuki | B62D 5/046 |
| 2019/0368901 | A1* | 12/2019 | Fujita | G01D 5/2449 |
| 2020/0052618 | A1* | 2/2020 | Sato | H02P 6/153 |
| 2021/0003422 | A1* | 1/2021 | Ishigami | H02P 6/16 |

* cited by examiner

MOTOR CONTROL DEVICE AND MOTOR

CROSS-REFERENCE TO RELATED APPLICATIONS

The present application is a Non-Provisional patent application of U.S. Provisional Patent Application No. 63/525,168, filed on Jul. 6, 2023, and claims priority under 35 U.S.C. § 119 to Japanese Patent Application No. 2024-013570, filed on Jan. 31, 2024, the entire contents of both priority applications are hereby incorporated herein by reference.

1. FIELD OF THE INVENTION

The present disclosure relates to motor control devices and motors.

2. BACKGROUND

A motor that detects a position of a rotor using a sensor magnet and a sensor is conventionally known.

In the motor as described above, in order to increase the accuracy of detecting the rotational position of the rotor, for example, a method of reducing an influence of an external magnetic field using a magneto resistive (MR) sensor that outputs signals of two systems out of phase with each other by 180° may be adopted. However, in this method, there is a case where the influence of the external magnetic field cannot be sufficiently reduced due to positional shift of the MR sensor, variations in characteristics of the MR sensor, and the like. Therefore, there is a case where the accuracy of detecting the rotational position of the rotor cannot be sufficiently improved.

SUMMARY

One example embodiment of a motor control device of the present disclosure is a motor control device to controls a motor, the motor control device including a calculator to calculate angle information related to a rotation angle of a rotor of the motor based on an output from a magnetic sensor, and a corrector to correct the angle information calculated by the calculator. The magnetic sensor is a sensor that includes a magnetoresistance effect element and outputs signals of two systems out of phase with each other by 180°. The corrector corrects the angle information using a correction amount expressed by a function including a current value of a motor current supplied to a stator of the motor and a phase angle of the motor current, a current value of a power source current supplied to the motor control device, and a mechanical angle of the rotor calculated based on an output from the magnetic sensor.

One example embodiment of a motor control device of the present disclosure includes the motor control device, the rotor rotatable about a central axis, the stator radially opposing the rotor across a gap, a sensor magnet fixed to the rotor, the magnetic sensor axially opposing the sensor magnet across a gap, and a shielding portion that shields a magnetic flux. The motor control device includes a substrate positioned on one axial side of the rotor. The shielding portion includes a tubular portion having a tubular shape surrounding the sensor magnet. An end portion on the axial one side of the tubular portion is in contact with a surface on an axial other side of the substrate. The magnetic sensor is attached to a portion surrounded by an end portion on the one axial side of the tubular portion of a surface on the axial other side of the substrate.

The above and other elements, features, steps, characteristics and advantages of the present disclosure will become more apparent from the following detailed description of the example embodiments with reference to the attached drawings.

DETAILED DESCRIPTION

Figure 1:
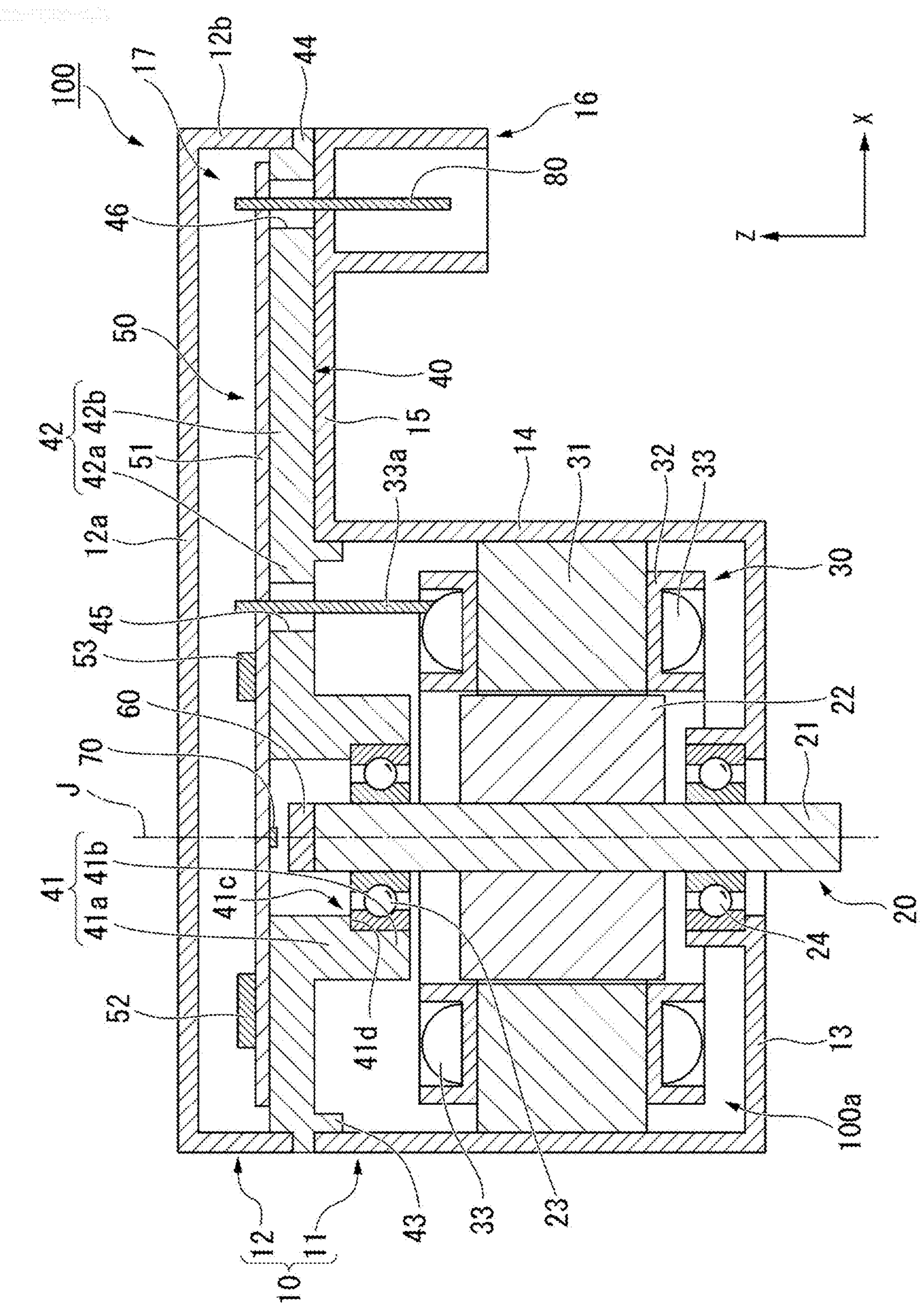
FIG. 1 is a cross-sectional view showing a motor in one example embodiment.

FIG. 1 virtually shows a central axis J of a motor of an example embodiment described below. In the following description, unless otherwise specified, the axial direction of the central axis J is simply called "axial", the radial direction about the central axis J is simply called "radial", and the circumferential direction about the central axis is J simply called "circumferential". A Z axis shown in each drawing indicates a direction in which the central axis J extends. The description below calls a first side (+Z side) in the axial direction toward which an arrow of the Z axis is directed as an "upper side", and a second side (−Z side) in the axial direction opposite to the first side toward which the arrow of the Z axis is directed as a "lower side".

In the example embodiment below, the upper side corresponds to the "axial one side", and the lower side corresponds to the "axial other side". The upper side and the lower side are simply terms for describing a relative positional relationship of each part, and thus an actual placement relationship and the like may be a placement relationship and the like other than the placement relationship and the like indicated by these terms.

A motor 100 of the present example embodiment shown in FIG. 1 is a motor with mechanical parts and electrical parts integrated together. The motor 100 of the present example embodiment is a motor mounted on a steering device of a vehicle. The motor 100 is, for example, a three-phase motor. As shown in FIG. 1, the motor 100 of the present example embodiment includes a housing 10, a rotor 20, a stator 30, a shielding portion 40, a motor control device 50, a sensor magnet 60, a magnetic sensor 70, and a power source terminal 80. The rotor 20 and the stator 30 constitute a motor body 100*a*.

The housing 10 internally accommodates the rotor 20, the stator 30, the shielding portion 40, the motor control device 50, the sensor magnet 60, the magnetic sensor 70, and the power source terminal 80. The housing 10 includes a housing body 11 and a lid body 12.

The housing body 11 is a tubular member opening on an upper side. The housing body 11 includes a bottom wall part 13, a first peripheral wall part 14, and an extension wall part 15. The bottom wall part 13 is positioned on a lower side of the stator 30. The first peripheral wall part 14 extends on the upper side from a radially outer edge part of the bottom wall part 13. The first peripheral wall part 14 has a cylindrical shape about the central axis J and opening on the upper side. The extension wall part 15 extends from an end portion on the upper side of the first peripheral wall part 14 to one side in one direction orthogonal to the axial direction. In FIG. 1, the one direction in which the extension wall part 15 extends is indicated by an X axis. A side (+X side) on which the arrow of the X axis is directed corresponds to one side on which the extension wall part 15 extends with respect to the first peripheral wall part 14. In the following description, a direction in which the extension wall part 15 extends is called an "extension direction X", a side (+X side) of the extension direction X on which an arrow of the X axis is directed is called an "extension direction one side", and a side (−X side) of the extension direction X opposite to the side on which the arrow of the X axis is directed is called an "extension direction other side". In the present example embodiment, the extension direction X is one direction in the radial direction.

The housing body 11 has a connector portion 16. That is, the motor 100 includes the connector portion 16. The connector portion 16 protrudes downward from an end portion on the extension direction one side (+X side) of the extension wall part 15. The connector portion 16 has a tubular shape opening on the lower side. The connector portion 16 holds the power source terminal 80. The power source terminal 80 is a metal member extending in the axial direction. The lower part of the power source terminal 80 is exposed to the inside of the connector portion 16. A terminal of an external device connected to the connector portion 16 is electrically connected to the power source terminal 80. For example, a plurality of the power source terminals 80 are provided.

The lid body 12 is positioned on the upper side of the housing body 11. The lid body 12 includes a lid wall part 12*a* and a second peripheral wall part 12*b*. The lid wall part 12*a* is positioned on the upper side of the motor control device 50. The lid wall part 12*a* covers the motor control device 50 from the upper side. The second peripheral wall part 12*b* protrudes downward from a radially outer edge part of the lid wall part 12*a*. The second peripheral wall part 12*b* has a tubular shape opening downward. The second peripheral wall part 12*b* sandwiches a flange portion 44, which will be described later, of the shielding portion 40 between the second peripheral wall part 12*b* and the housing body 11 in the axial direction.

The rotor 20 is rotatable about the central axis J. The rotor 20 includes a shaft 21 and a rotor body 22. The shaft 21 has a columnar shape axially extending about the central axis J. An end portion on the lower side of the shaft 21 protrudes downward relative to the housing 10. The shaft 21 is rotatably supported around the central axis J by a pair of bearings 23 and 24. The pair of bearings 23 and 24 are, for example, rolling bearings such as ball bearings. The bearing 23 supports a part of the shaft 21 positioned on the upper side relative to the rotor body 22. An end portion on the upper side of the shaft 21 is positioned on the upper side relative to the bearing 23. The bearing 23 is held by the shielding portion 40. The bearing 24 supports a part of the shaft 21 positioned on the lower side relative to the rotor body 22. The bearing 24 is held by the bottom wall part 13. The rotor body 22 is fixed to an outer peripheral surface of the shaft 21. Although not shown, the rotor body 22 includes a rotor core fixed to the shaft 21 and a magnet held by the rotor core.

The sensor magnet 60 is fixed to the rotor 20. In the present example embodiment, the sensor magnet 60 is fixed to the shaft 21. More specifically, the sensor magnet 60 is fixed to an end surface on the upper side of the shaft 21. The sensor magnet 60 has a disk shape about the central axis J. In the present example embodiment, the outer diameter of the sensor magnet 60 is the same as the outer diameter at the end portion on the upper side of the shaft 21. The outer diameter of the sensor magnet 60 may be different from the outer diameter at the end portion on the upper side of the shaft 21. In the present example embodiment, the sensor magnet 60 is a magnet having a plurality of N poles and a plurality of S poles alternately arranged in the circumferential direction. The number of magnetic poles of the sensor magnet 60 is the same as the number of magnetic poles of the rotor 20.

The stator 30 radially faces the rotor 20 across a gap. In the present example embodiment, the stator 30 is positioned radially outside the rotor 20. The stator 30 has an annular shape surrounding the rotor 20. In the present example embodiment, the stator 30 has a substantially circular annular shape about the central axis J. The stator 30 includes a stator core 31, an insulator 32, and a plurality of coils 33. The plurality of coils 33 are attached to the stator core 31 via the insulator 32. The coil 33 is configured by winding a conductive wire around teeth of the stator core 31. A conductive portion 33*a* extends on the upper side from at least one of the coils 33. That is, the motor 100 includes the conductive portion 33*a*. In the present example embodiment, the conductive portion 33*a* is a coil lead wire drawn on the upper side from the coil 33. The conductive portion 33*a* is configured by a conductive wire constituting the coil 33. In the present example embodiment, the conductive portion 33*a* is drawn on the upper side from each of the plurality of coils 33.

The shielding portion 40 is a member that shields a magnetic flux. The material constituting the shielding portion 40 is not particularly limited as long as it can shield a magnetic flux. The shielding portion 40 is made of, for example, aluminum. The shielding portion 40 is grounded by being in contact with the housing 10. The shielding portion 40 is attached to the end portion on the upper side of the housing body 11. The shielding portion 40 is positioned between the stator 30 and the motor control device 50 in the axial direction. The shielding portion 40 includes a tubular portion 41, a base part 42, a fitting tube portion 43, and a flange portion 44.

The tubular portion 41 has a tubular shape surrounding the sensor magnet 60. The tubular portion 41 opens on both sides in the axial direction. In the present example embodiment, the tubular portion 41 has a cylindrical shape opening on both sides in the axial direction about the central axis J. The tubular portion 41 is disposed on the upper side of the rotor body 22 at an interval. The tubular portion 41 includes an upper tube portion 41*a* and a lower tube portion 41*b*. The upper tube portion 41*a* is an upper side part of the tubular portion 41. The end portion on the upper side of the upper tube portion 41*a* is an end portion on the upper side of the tubular portion 41. The end portion on the upper side of the upper tube portion 41*a* is in contact with a surface on the lower side of a substrate 51 described later. An end surface on the upper side of the upper tube portion 41*a* is in contact with a surface on the lower side of the substrate 51 over the entire circumference in the circumferential direction. The end surface on the upper side of the upper tube portion 41*a* is positioned on the upper side relative to the end surface on the upper side of the sensor magnet 60. The upper tube portion 41*a* is positioned at the end portion on the upper side of the shaft 21 and radially outside the sensor magnet 60. The upper tube portion 41*a* surrounds the end portion on the upper side of the shaft 21 and the sensor magnet 60.

The lower tube portion 41*b* is a lower side part of the tubular portion 41. The end portion on the lower side of the lower tube portion 41*b* is an end portion on the lower side of the tubular portion 41. The lower tube portion 41*b* is connected to the lower side of the upper tube portion 41*a*. The inner diameter of the lower tube portion 41*b* is larger than the inner diameter of the upper tube portion 41*a*. A step portion 41*c* having a step surface 41*d* facing downward is provided between the inner peripheral surface of the upper tube portion 41*a* and the inner peripheral surface of the lower tube portion 41*b* in the axial direction. The lower tube portion 41*b* is positioned radially outside the bearing 23. The lower tube portion 41*b* is a bearing holding portion that holds the bearing 23 radially inside. When the bearing 23 is held by the lower tube portion 41*b*, the bearing 23 that rotatably supports the rotor 20 is held by the tubular portion 41. This eliminates the need to provide a member for holding the bearing 23 separately from the shielding portion 40. Therefore, it is possible to suppress the number of components of the motor 100 from increasing.

In the present example embodiment, the conductive portion 33*a* and the connector portion 16 are positioned radially outside relative to the tubular portion 41. The connector portion 16 is positioned radially outside relative to the conductive portion 33*a*. The distance between the tubular portion 41 and the connector portion 16 is larger than the distance between the tubular portion 41 and the conductive portion 33*a*.

The base part 42 extends radially outward from the end portion on the upper side of the tubular portion 41. The base part 42 is provided separately on the lower side of the lid wall part 12*a*. The base part 42 includes a lid part 42*a* and an extension part 42*b*. The lid part 42*a* covers an opening on the upper side of the first peripheral wall part 14. The lid part 42*a* has a disk shape about the central axis J. The lid part 42*a* is provided with a first through hole 45 axially penetrating the lid part 42*a*. The conductive portion 33*a* axially passes through the first through hole 45. The extension part 42*b* extends from the lid part 42*a* to an extension direction one side (+X side). The extension part 42*b* is in contact with the surface on the upper side of the extension wall part 15. The extension part 42*b* is provided with a second through hole 46 axially penetrating the extension part 42*b*. The power source terminal 80 axially passes through the second through hole 46. The upper end portion of the base part 42 is fitted into the lower end portion of the second peripheral wall part 12*b*.

The fitting tube portion 43 protrudes downward from a radially outer edge part of the lid part 42*a*. The fitting tube portion 43 has a cylindrical shape about the central axis J and opening on the lower side. The fitting tube portion 43 is fitted into the upper end portion of the first peripheral wall part 14. The flange portion 44 protrudes radially outward from the base part 42. The flange portion 44 is provided over the entire circumference of the radially outer edge part of the base part 42. The flange portion 44 has an annular shape surrounding the central axis J. The flange portion 44 is axially sandwiched between the housing body 11 and the lid body 12 in a state of being in contact with the housing body 11 and the lid body 12.

At least a part of the surface on the upper side of the shielding portion 40 is in contact with a surface on the lower side of the substrate 51 described later. That is, the shielding portion 40 comes into contact with the motor control device 50. In the present example embodiment, almost the entire surface on the upper side of the shielding portion 40 except the radially outer edge part is in contact with the surface on the lower side of the substrate 51. Heat of the substrate 51 is transferred to the shielding portion 40 and discharged to the outside of the motor 100 directly from the shielding portion 40 or via the housing 10. Thus, in the present example embodiment, the shielding portion 40 is a heat sink connected to the motor control device 50. Therefore, the heat of the motor control device 50 can be discharged to the outside of the motor 100 using the shielding portion 40. Note that the shielding portion 40 may be connected to the motor control device 50 via another member or the like. The shielding portion 40 may be connected to the motor control device 50 by being fixed to the motor control device 50 with, for example, an adhesive having high thermal conductivity.

In the present example embodiment, the shielding portion 40 and the lid body 12 constitute an accommodation portion 17 that internally accommodates the motor control device 50. The internal space of the accommodation portion 17 is a space surrounded by the lid wall part 12*a* of the lid body 12, the second peripheral wall part 12*b* of the lid body 12, and the base part 42.

The motor control device 50 controls the motor 100. In the present example embodiment, the motor control device 50 controls the motor 100 by vector control of controlling the motor current supplied to the stator 30 by dividing the motor current into a d axis current component and a q axis current component. The motor control device 50 is accommodated in the accommodation portion 17. The motor control device 50 includes the substrate 51, a control unit 52, and an inverter circuit unit 53. The substrate 51 is positioned on the upper side of the rotor 20. The plate surface of the substrate 51 faces the axial direction. More specifically, the plate surface of the substrate 51 is orthogonal to the axial direction. The surface on the upper side of the substrate 51 is provided with the control unit 52 and the inverter circuit unit 53. The substrate 51 is fixed to the shielding portion 40, for example. The surface on the lower side of the substrate 51 is in contact with the surface on the upper side of the base part 42. The surface on the lower side of the substrate 51 closes an opening part on the upper side of the tubular portion 41.

A plurality of the conductive portions 33*a* are electrically connected to the substrate 51. Due to this, the conductive portion 33*a* electrically connects the stator 30 and the substrate 51. More specifically, the conductive portion 33*a* electrically connects the inverter circuit unit 53 and the coil 33. The conductive portion 33*a* axially passes through a through hole provided in the substrate 51, and is electrically connected to the substrate 51 by solder or the like. The power source terminal 80 is electrically connected to the substrate 51. The power source terminal 80 axially passes through a through hole provided in the substrate 51, and is electrically connected to the substrate 51 by solder or the like. The substrate 51 is supplied with electric power from an external device connected to the connector portion 16 via the power source terminal 80.

The surface on the lower side of the substrate 51 is attached with the magnetic sensor 70. More specifically, the magnetic sensor 70 is attached to a part surrounded by the end portion on the upper side of the tubular portion 41 in the surface on the lower side of the substrate 51. In the present example embodiment, the central axis J passes through the magnetic sensor 70. The magnetic sensor 70 is positioned away on the upper side of the sensor magnet 60. The magnetic sensor 70 axially faces the sensor magnet 60 across a gap. The magnetic sensor 70 and the sensor magnet 60 are surrounded over the entire circumference around the central axis J by the tubular portion 41. The entire magnetic sensor 70 except the surface attached to the substrate 51 is positioned on the lower side relative to the end surface on the upper side of the tubular portion 41.

Figure 2:
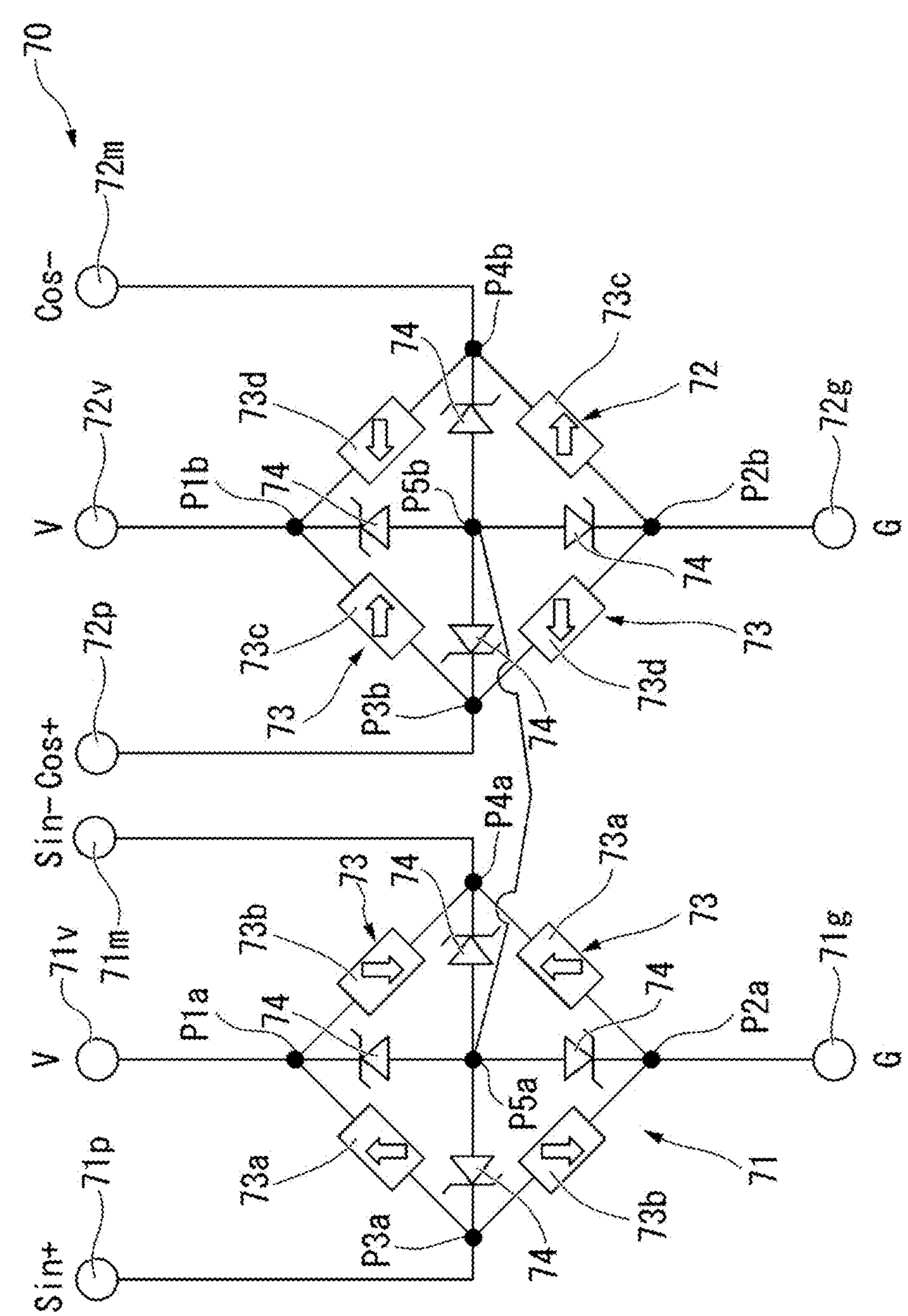
FIG. 2 is a circuit diagram showing a circuit configuration of a magnetic sensor in one example embodiment.

As shown in FIG. 2, the magnetic sensor 70 is an MR sensor including a magnetoresistance effect element 73. The magnetoresistance effect element 73 is a part that detects a magnetic field of the magnetic sensor 70. Although not shown, the magnetoresistance effect element 73 is positioned on the lower side relative to the end surface on the upper side of the tubular portion 41. The magnetic sensor 70 outputs signals of two systems out of phase with each other by 180°. The magnetic sensor 70 includes a first bridge circuit 71 and a second bridge circuit 72.

The first bridge circuit 71 is provided between an input terminal 71*v* and a ground terminal 71*g*. The first bridge circuit 71 is configured by connecting, in parallel, two pairs of magnetoresistance effect elements 73*a* and 73*b* connected in series. One pair of the magnetoresistance effect elements 73*a* and 73*b* are disposed in the order of the magnetoresistance effect element 73*a* and the magnetoresistance effect element 73*b* from the input terminal 71*v* toward the ground terminal 71*g*. The other pair of the magnetoresistance effect elements 73*a* and 73*b* are disposed in the order of the magnetoresistance effect element 73*b* and the magnetoresistance effect element 73*a* from the input terminal 71*v* toward the ground terminal 71*g*. A point P1*a* where the input terminal 71*v* is connected, a point P2*a* where the ground terminal 71*g* is connected, a point P3*a* between one pair of the magnetoresistance effect elements 73*a* and 73*b*, and a point P4*a* between the other pair of the magnetoresistance effect elements 73*a* and 73*b* are each connected to a point P5*a*. A zener diode 74 is provided between the point P5*a* and each of the points P1*a*, P2*a*, P3*a*, and P4*a*. A first output terminal 71*p* is connected to the point P3*a*. A second output terminal 71*m* is connected to the point P4*a*.

The second bridge circuit 72 is provided between an input terminal 72*v* and a ground terminal 72*g*. The second bridge circuit 72 is configured by connecting, in parallel, two pairs of magnetoresistance effect elements 73*c* and 73*d* connected in series. One pair of the magnetoresistance effect elements 73*c* and 73*d* are disposed in the order of the magnetoresistance effect element 73*c* and the magnetoresistance effect element 73*d* from the input terminal 72*v* toward the ground terminal 72*g*. The other pair of the magnetoresistance effect elements 73*c* and 73*d* are disposed in the order of the magnetoresistance effect element 73*d* and the magnetoresistance effect element 73*c* from the input terminal 72*v* toward the ground terminal 72*g*. A point P1*b* where the input terminal 72*v* is connected, a point P2*b* where the ground terminal 72*g* is connected, a point P3*b* between one pair of the magnetoresistance effect elements 73*c* and 73*d*, and a point P4*b* between the other pair of the magnetoresistance effect elements 73*c* and 73*d* are each connected to a point P5*b*. The zener diode 74 is provided between the point P5*b* and each of the points P1*b*, P2*b*, P3*b*, and P4*b*. A first output terminal 72*p* is connected to the point P3*b*. A second output terminal 72*m* is connected to the point P4*b*. The point P5*a* and the point P5*b* are connected to each other. In FIG. 2, the arrow shown in each of the magnetoresistance effect elements 73 indicates a magnetization orientation of a pin layer of each of the magnetoresistance effect elements 73. The magnetization orientation of the pin layers of the magnetoresistance effect elements 73*a* and 73*b* in the first bridge circuit 71 is different by 90° from the magnetization orientation of the pin layers of the magnetoresistance effect elements 73*c* and 73*d* in the second bridge circuit 72. The magnetization orientation of the pin layer of the magnetoresistance effect element 73*a* and the magnetization orientation of the pin layer of the magnetoresistance effect element 73*b* are opposite to each other. The magnetization orientation of the pin layer of the magnetoresistance effect element 73*c* and the magnetization orientation of the pin layer of the magnetoresistance effect element 73*d* are opposite to each other.

When the rotor 20 is rotating, a sine wave (sin wave) is output from each of the first output terminal 71*p* and the second output terminal 71*m* of the first bridge circuit 71. The sine wave output from the first output terminal 71*p* and the sine wave output from the second output terminal 71*m* are out of phase with each other by 180°. A cosine wave (cos wave) is output from each of the first output terminal 72*p* and the second output terminal 72*m* of the second bridge circuit 72. The cosine wave output from the first output terminal 72*p* and the cosine wave output from the second output terminal 72*m* are out of phase with each other by 180°. Thus, the magnetic sensor 70 outputs, as signals of two systems, the sine waves of two systems out of phase with each other by 180° and the cosine waves of two systems out of phase with each other by 180°.

Figure 3:
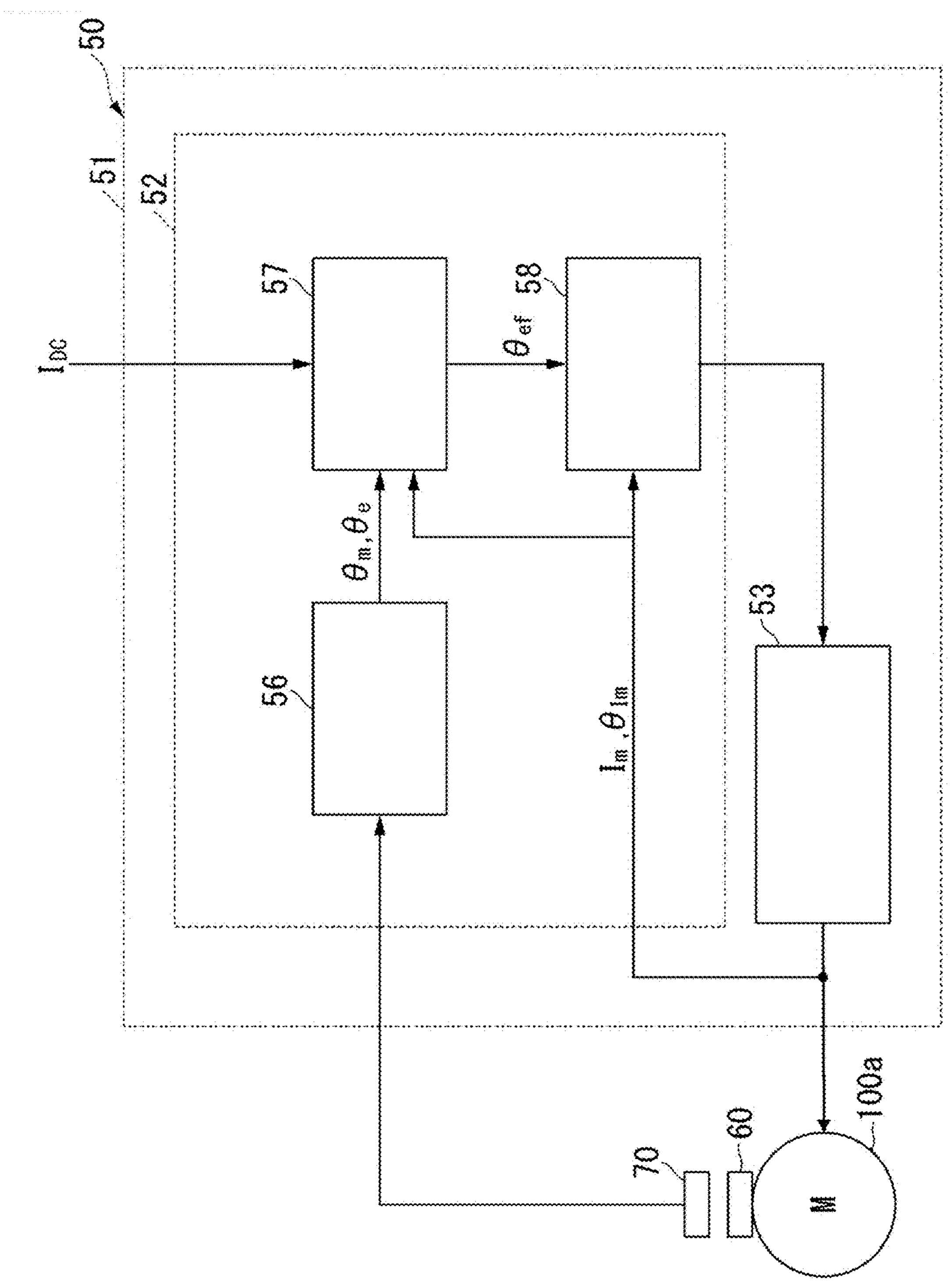
FIG. 3 is a block diagram showing a functional block of a motor control device in one example embodiment.

The control unit 52 is a microprocessor such as a microcontroller unit (MCU), for example. As shown in FIG. 3, the control unit 52 includes a calculator 56, a corrector 57, and a current control unit 58. That is, the motor control device 50 includes the calculator 56, the corrector 57, and the current control unit 58. The calculator 56 calculates angle information related to a rotation angle θ of the rotor 20 of the motor 100 based on the output from the magnetic sensor 70. In the present example embodiment, the calculator 56 calculates an electrical angle de of the rotor 20 and a mechanical angle $\theta_m$ of the rotor 20 calculated from the output from the magnetic sensor 70.

Specifically, the calculator 56 calculates the mechanical angle $\theta_m$ and the electrical angle $\theta_e$ based on a sine wave having a double amplitude obtained by subtracting an output signal (−sin wave) of the second output terminal 71*m* from an output signal (+sin wave) of the first output terminal 71*p* and a cos wave having a double amplitude obtained by subtracting an output signal (−cos wave) of the second output terminal 72*m* from an output signal (+cos wave) of the first output terminal 72*p*. The mechanical angle $\theta_m$ and the electrical angle de calculated by the calculator 56 are input to the corrector 57.

The corrector 57 corrects the angle information calculated by the calculator 56. In the present example embodiment, the angle information corrected by the corrector 57 is the electrical angle $\theta_e$. A current value $I_{DC}$ of the power source current supplied from the external device connected to the connector portion 16 to the motor control device 50 is input to the corrector 57. A current value $I_m$ of the motor current supplied from the inverter circuit unit 53 to the stator 30 and a phase angle $\theta_{Im}$ of the motor current supplied to the stator 30 are input to the corrector 57. In the present example embodiment, the motor current supplied to the stator 30 is a three-phase alternating current. The current value $I_m$ of the motor current is a combined value of current values of the three-phase alternating current. When the current value of the d axis current component of the motor current is $I_d$ and the current value of the q axis current component of the motor current is $I_q$, the current value $I_m$ is expressed by the following expression (1).

[Mathematical expression 1]

$$I_m = \sqrt{I_d^2 + I_q^2} \tag{1}$$

The corrector 57 corrects the angle information, that is, the electrical angle $\theta_e$ using a correction amount expressed by a function including the current value $I_m$ of the motor current supplied to the stator 30 of the motor 100 and the phase angle $\theta_{Im}$ of the motor current, the current value $I_{DC}$ of the power source current supplied to the motor control device 50, and the mechanical angle $\theta_m$ of the rotor 20 calculated based on the output from the magnetic sensor 70.

When the current value of the motor current is $I_m$, the phase angle of the motor current is $\theta_{Im}$, the current value of the power source current is $I_{DC}$, the mechanical angle of the rotor 20 calculated based on the output from the magnetic sensor 70 is $\theta_m$, the electrical angle of the rotor 20 calculated based on the output from the magnetic sensor 70 is $\theta_e$, and the correction amount is $\theta_f$, the following expression (2) is satisfied.

[Mathematical expression 2]

$$\theta_f = A\sin(\theta_e + P) + Z \quad (2)$$

$$A = I_m C_1(\sin(2(\theta_m + C_2)) + C_3)$$

$$P = -\theta_m - \theta_{Im} + C_4$$

$$Z = I_{DC} C_5(\sin(\theta_m + C_6) + C_7)$$

where $C_1$, $C_2$, $C_3$, $C_4$, $C_5$, $C_6$, and $C_7$ are constants.

A in the above expression (2) is a component that depends on the current value $I_m$ of the motor current. P in expression (2) is a component that depends on the phase angle $\theta_{Im}$ and the mechanical angle $\theta_m$. Z in expression (2) is a component that depends on the current value $I_{DC}$ of the power source current. Expression (2) is an experimentally obtained expression. Expression (2) is experimentally obtained from the relationship between a change in an error $\theta_{er}$ of the electrical angle de of the rotor 20 calculated based on the output from the magnetic sensor 70 with respect to an actual electrical angle $\theta_{ea}$ of the rotor 20, the current value $I_m$ of the motor current, the phase angle $\theta_{Im}$ of the motor current, the current value $I_{DC}$ of the power source current, and the mechanical angle $\theta_m$ of the rotor 20 calculated based on the output from the magnetic sensor 70. The error of the electrical angle $\theta_e$ of the rotor 20 calculated based on the output from the magnetic sensor 70 with respect to the actual electrical angle $\theta_{ea}$ of the rotor 20 can be approximated by the following expression (3), for example.

[Mathematical expression 3]

$$\theta_{er} = \alpha_1\sin(\theta_{ea} + \beta_1) + \alpha_3\sin(3\theta_{ea} + \beta_3) + \alpha_5\sin(5\theta_{ea} + \beta_5) \quad (3)$$

where $\alpha_1$, $\alpha_3$, $\alpha_5$, $\beta_1$, $\beta_3$, and $\beta_5$ are constants.

Assuming that the absolute value of the value of the error $\theta_{er}$ obtained from the above expression (3) is the absolute value of the correction amount $\theta_f$ to be corrected, the constants $C_1$ to $C_7$ can be calculated by setting up simultaneous expressions where the value of the error $\theta_{er}$, the current value $I_m$, the phase angle $\theta_{Im}$, the current value $I_{DC}$, and the mechanical angle $\theta_m$ are substituted into the above expression (2) for each of the plurality of electrical angles $\theta_{ea}$.

By adding the correction amount $\theta_f$ obtained from expression (2) to the electrical angle $\theta_e$ of rotor 20 calculated based on the output from magnetic sensor 70, the corrector 57 corrects the electrical angle $\theta_e$ and calculates a corrected electrical angle $\theta_{ef}$. The electrical angle $\theta_{ef}$ calculated by the corrector 57 is input to the current control unit 58.

The current control unit 58 controls a signal to be sent to the inverter circuit unit 53 based on the electrical angle $\theta_{ef}$ input from the corrector 57, and controls the motor current to be output from the inverter circuit unit 53. The current control unit 58 controls the motor current output from the inverter circuit unit 53 by feedback control.

The inverter circuit unit 53 includes a plurality of switching elements. The inverter circuit unit 53 is driven based on a signal from the current control unit 58, and supplies a motor current to the coil 33 of the stator 30. The plurality of switching elements constituting the inverter circuit unit 53 are, for example, field effect transistors (FETs).

At least a part of the function of each component of the motor control device 50 described above is implemented, for example, by a processor such as a CPU executing a program stored in a storage unit not shown, that is, software. At least a part of the function of each component of the motor control device 50 may be implemented by hardware including a circuit unit such as a large scale integration (LSI), an application specific integrated circuit (ASIC), a field-programmable gate array (FPGA), and a graphics processing unit (GPU), or may be implemented by cooperation of software and hardware. The storage unit not shown is implemented by a storage medium such as a random access memory (RAM), a read only memory (ROM), a hard disk drive (HDD), and a flash memory.

Since signals of the two systems out of phase with each other by 180° are output from the magnetic sensor 70, the calculator 56 described above can remove a part of the influence of the external magnetic field applied to the magnetic sensor 70 by adding the signals of the two systems. For example, each of the sine wave output from the first output terminal 71*p* and the sine wave output from the second output terminal 71*m* includes the influence of the external magnetic field as an in-phase component. Therefore, by subtracting the sine wave output from the second output terminal 71*m* out of phase by 180° from the sine wave output from the first output terminal 71*p*, it is possible to cancel and remove the influence of the external magnetic field included in each of the sine waves as the in-phase component. However, the influence of the external magnetic field included in the sine waves output from the first output terminal 71*p* and the second output terminal 71*m* varies due to a positional shift of the magnetic sensor 70, variations in characteristics of the magnetic sensor 70, and the like, and there is a case where the influence of the external magnetic field cannot be completely removed only by the above method. Therefore, there is a case where the rotational position of the rotor 20 cannot be accurately detected.

In view of the above problem, according to the present example embodiment, the corrector 57 corrects the electrical angle $\theta_e$ using the correction amount $\theta_f$ expressed by the function including the current value $I_m$ of the motor current and the phase angle $\theta_{Im}$ of the motor current, the current value $I_{DC}$ of the power source current supplied to the motor control device 50, and the mechanical angle $\theta_m$ of the rotor 20 calculated based on the output from the magnetic sensor 70. The influence of the external magnetic field applied to the magnetic sensor 70 includes an influence caused by the motor current supplied to the stator 30 and the power source current supplied to the motor control device 50. Therefore, the influence of the external magnetic field can be suitably removed by correcting the electrical angle $\theta_e$ using the correction amount $\theta_f$ expressed by the function including the parameters of the motor current and the power source current. This can improve the detection accuracy of the rotational position of the rotor 20. In particular, the motor 100 mounted on a steering device mounted on a vehicle as in the present example embodiment is required to detect the rotational position of the rotor 20 more accurately. Therefore, the effect of improving the detection accuracy of the rotational position of the rotor 20 described above can be obtained particularly usefully when the motor 100 is mounted on the steering device of the vehicle.

According to the present example embodiment, the angle information corrected by the corrector 57 is the electrical angle $\theta_e$. In the present example embodiment, the magnetic sensor 70 is an MR sensor that can detect the electrical angle $\theta_e$ of the rotor 20. When the electrical angle de of the rotor 20 is detected by the MR sensor, the number of magnetic poles of the sensor magnet 60 is the same as the number of magnetic poles of the rotor 20. On the other hand, when the mechanical angle $\theta_m$ of the rotor 20 is detected by the MR sensor, the sensor magnet 60 is a two-pole magnet having one N pole and one S pole facing each other in the radial direction. Therefore, a configuration in which the electrical angle $\theta_e$ can be detected by the magnetic sensor 70 improves the accuracy of a detected value. Therefore, by setting the angle information corrected by the corrector 57 to the electrical angle $\theta_e$, it is possible to further improve the detection accuracy of the rotational position of the rotor 20.

According to the present example embodiment, the above-described expression (2) is satisfied. By obtaining the correction amount $\theta_f$ as in expression (2), the electrical angle $\theta_e$ can be easily corrected with high accuracy based on the parameters of the motor current and the power source current.

According to the present example embodiment, the shielding portion 40 that shields a magnetic flux includes the tubular portion 41 having a tubular shape surrounding the sensor magnet 60. The end portion on the upper side of the tubular portion 41 is in contact with a surface on the lower side of the substrate 51. The magnetic sensor 70 is attached to a part surrounded by the end portion on the upper side of the tubular portion 41 in the surface on the lower side of the substrate 51. Therefore, the magnetic flux from the radially outside of the tubular portion 41 toward the magnetic sensor 70 can be shielded by the tubular portion 41. This can detect the magnetic flux generated from the sensor magnet 60 by the magnetic sensor 70 while reducing the influence of the external magnetic field. Therefore, the detection accuracy of the rotational position of the rotor 20 can be further improved. Expression (2) described above is an expression obtained experimentally in a structure in which the sensor magnet 60 and the magnetic sensor 70 are surrounded by the tubular portion 41 of the shielding portion 40. Therefore, in the motor 100 having the structure, the electrical angle $\theta_e$ can be corrected with higher accuracy by correcting the electrical angle $\theta_e$ using the correction amount $\theta_f$ of expression (2). Even in the motor 100 not having the structure, the accuracy of the electrical angle $\theta_e$ can be improved by correcting the electrical angle $\theta_e$ using the correction amount $\theta_f$ of expression (2) as compared with the case of not correcting the electrical angle $\theta_e$.

According to the present example embodiment, the conductive portion 33*a* is positioned radially outside relative to the tubular portion 41. Therefore, of the magnetic flux generated from the motor current flowing through the conductive portion 33*a*, the magnetic flux flowing toward the magnetic sensor 70 is easily shielded by the tubular portion 41. This can reduce the influence of the external magnetic field applied to the magnetic sensor 70 by the motor current flowing through the conductive portion 33*a*, and can further improve the detection accuracy of the rotational position of the rotor 20.

According to the present example embodiment, the connector portion 16 holding the power source terminal 80 is positioned radially outside relative to the tubular portion 41. Therefore, of the magnetic flux generated from the power source current flowing through the power source terminal 80, the magnetic flux flowing toward the magnetic sensor 70 is easily shielded by the tubular portion 41. This can reduce the influence of the external magnetic field applied to the magnetic sensor 70 by the power source current flowing through the power source terminal 80, and can further improve the detection accuracy of the rotational position of the rotor 20.

The present disclosure is not limited to the above-described example embodiment, and other configurations and other methods can be employed within the scope of the technical idea of the present disclosure. The correction amount used when the corrector corrects the angle information calculated by the calculator is not particularly limited as long as the correction amount is expressed by a function including the current value of the motor current and the phase angle of the motor current, the current value of the power source current, and the mechanical angle of the rotor calculated based on the output from the magnetic sensor. The angle information to be corrected by the corrector may be the mechanical angle of the rotor.

The structure of the motor mounted with the motor control device is not particularly limited. The shielding portion does not need to be a heat sink. The conductive portion that electrically connects the stator and the substrate may have any configuration and may be a bus bar. The conductive portion may be disposed in any manner with respect to the tubular portion of the shielding portion. The connector portion may be disposed in any manner with respect to the tubular portion of the shielding portion. The motor does not need to include the shielding portion. An application of the motor is not particularly limited. The motor may be mounted on a device other than a steering device among devices mounted on the vehicle, or may be mounted on a device other than the vehicle.

The present technique can have the following configurations.

[1] A motor control device that controls a motor, the motor control device including a calculator tot calculate angle information related to a rotation angle of a rotor of the motor based on an output from a magnetic sensor, and a correction portion to correct the angle information calculated by the calculator. The magnetic sensor is a sensor that includes a magnetoresistance effect element and outputs signals of two systems out of phase with each other by 180°, and the correction portion corrects the angle information using a correction amount expressed by a function including a current value of a motor current supplied to a stator of the motor and a phase angle of the motor current, a current value of a power source current supplied to the motor control device, and a mechanical angle of the rotor calculated based on an output from the magnetic sensor.

[2] The motor control device according to [1], in which the angle information is an electrical angle.

[3] The motor control device according to [2], in which when a current value of the motor current is $I_m$, a phase angle of the motor current is $\theta_{Im}$, a current value of the power source current is $I_{DC}$, a mechanical angle of the rotor calculated based on an output from the magnetic sensor is $\theta_m$, an electrical angle of the rotor calculated based on an output from the magnetic sensor is $\theta_e$, and the correction amount is $\theta_f$, a following expression is satisfied:

$$\theta_f = A\sin(\theta_e + P) + Z$$

$$A = I_m C_1(\sin(2(\theta_m + C_2)) + C_3)$$

$$P = -\theta_m - \theta_{Im} + C_4$$

$$Z = I_{DC} C_5(\sin(\theta_m + C_6) + C_7)$$

where $C_1$, $C_2$, $C_3$, $C_4$, $C_5$, $C_6$, and $C_7$ are constants.

[4] A motor including: the motor control device according to any one of [1] to [3], the rotor rotatable about a central axis; the stator radially opposing the rotor across a gap, a sensor magnet fixed to the rotor, the magnetic sensor axially opposing the sensor magnet across a gap, and a shielding portion that shields a magnetic flux, in which the motor control device includes a substrate positioned on one axial side of the rotor, the shielding portion includes a tubular portion having a tubular shape surrounding the sensor magnet, an end portion on the one axial side of the tubular portion is in contact with a surface on another axial side of the substrate, and the magnetic sensor is attached to a portion surrounded by an end portion on the one axial side of the tubular portion of a surface on the other axial side of the substrate.

[5] The motor according to [4] including a conductive portion to electrically connect the stator and the substrate, in which the conductive portion is positioned radially outside relative to the tubular portion.

[6] The motor according to [4] or [5] including a connector portion to hold a power source terminal electrically connected to the substrate, in which the connector portion is positioned radially outside relative to the tubular portion.

[7] The motor according to any one of [4] to [6], in which the shielding portion is a heat sink connected to the motor control device.

[8] The motor according to any one of [4] to [7], in which a bearing that rotatably supports the rotor is held by the tubular portion.

The configurations and methods described above in the present description can be appropriately combined within a range consistent with each other.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device that controls a motor, the motor control device comprising:

a calculator to calculate angle information related to a rotation angle of a rotor of the motor based on an output from a magnetic sensor; and a corrector to correct the angle information calculated by the calculator; wherein the magnetic sensor is a sensor that includes a magnetoresistance effect element and is operable to output signals of two systems out of phase with each other by 180°; and the corrector is operable to correct the angle information using a correction amount expressed by a function including a current value of a motor current supplied to a stator of the motor and a phase angle of the motor current, a current value of a power source current supplied to the motor control device, and a mechanical angle of the rotor calculated based on an output from the magnetic sensor;

wherein the motor comprises the motor control device; and the rotor is rotatable about a central axis;

the stator is radially opposing the rotor across a gap;

a sensor magnet is fixed to the rotor;

the magnetic sensor axially opposes the sensor magnet across a gap; and a shielding portion is to shield a magnetic flux; wherein the motor control device includes a substrate positioned on one axial side of the rotor;

the shielding portion includes a tubular portion having a tubular shape surrounding the sensor magnet;

an end portion on the one axial side of the tubular portion is in contact with a surface on another axial side of the substrate; and the magnetic sensor is attached to a portion surrounded by an end portion on the one axial side of the tubular portion of a surface on the other axial side of the substrate.

2. The motor control device according to claim 1, wherein the angle information is an electrical angle.

3. The motor control device according to claim 2, wherein when a current value of the motor current is $I_m$, a phase angle of the motor current is $\theta_{Im}$, a current value of the power source current is $I_{DC}$, a mechanical angle of the rotor calculated based on an output from the magnetic sensor is $\theta_m$, an electrical angle of the rotor calculated based on an output from the magnetic sensor is $\theta_e$, and the correction amount is $\theta_f$, a following expression is satisfied:

$$\theta_f = A\sin(\theta_e + P) + Z$$

$$A = I_m C_1(\sin(2(\theta_m + C_2)) + C_3)$$

$$P = -\theta_m - \theta_{Im} + C_4$$

$$Z = I_{DC} C_5(\sin(\theta_m + C_6) + C_7)$$

where $C_1$, $C_2$, $C_3$, $C_4$, $C_5$, $C_6$, and $C_7$ are constants.

4. The motor according to claim 1, further comprising: a conductive portion to electrically connect the stator and the substrate; wherein the conductive portion is positioned radially outside relative to the tubular portion.

5. The motor according to claim 1, further comprising: a connector portion to hold a power source terminal electrically connected to the substrate; wherein the connector portion is positioned radially outside relative to the tubular portion.

6. The motor according to claim 1, wherein the shielding portion includes a heat sink connected to the motor control device.

7. The motor according to claim 1, wherein a bearing that rotatably supports the rotor is held by the tubular portion.

* * * * *